US008173285B2

(12) United States Patent
Dougherty

(10) Patent No.: US 8,173,285 B2
(45) Date of Patent: May 8, 2012

(54) LITHIUM BATTERY MANAGEMENT SYSTEM

(75) Inventor: Thomas J. Dougherty, Waukesha, WI (US)

(73) Assignee: Johnson Controls Technology Company, Holland, MI (US)

( * ) Notice: Subject to any disclaimer, the term of this patent is extended or adjusted under 35 U.S.C. 154(b) by 727 days.

(21) Appl. No.: 11/921,442

(22) PCT Filed: Feb. 1, 2006

(86) PCT No.: PCT/US2006/003469
§ 371 (c)(1),
(2), (4) Date: Mar. 12, 2009

(87) PCT Pub. No.: WO2007/050109
PCT Pub. Date: May 3, 2007

(65) Prior Publication Data
US 2009/0208815 A1    Aug. 20, 2009

Related U.S. Application Data

(60) Provisional application No. 60/686,573, filed on Jun. 2, 2005.

(51) Int. Cl.
*H01M 10/52* (2006.01)
*H01J 7/04* (2006.01)
(52) U.S. Cl. .......................................... 429/62; 320/152
(58) Field of Classification Search ................ 429/61, 429/62; 320/150, 152
See application file for complete search history.

(56) References Cited

U.S. PATENT DOCUMENTS

| 5,602,460 A * | 2/1997 | Fernandez et al. ........... 320/152 |
| 6,608,470 B1 | 8/2003 | Oglesbee et al. |
| 2005/0225421 A1 * | 10/2005 | Furuta et al. ................. 337/167 |

FOREIGN PATENT DOCUMENTS

| JP | 2000152516 | 5/2000 |
| WO | WO 2004/034542 A1 | 4/2004 |
| WO | WO 2005/046017 A1 | 5/2005 |

OTHER PUBLICATIONS

Office Action for European Application No. 06844068.4, dated Dec. 10, 2010, 4 pages.
Written Opinion of the International Searching Authority of International Application No. PCT/US2006/003469; 4 pages, (Feb. 28, 2007).
International Search Report for International Application No. PCT/US2006/003469; mailed Feb. 28, 2007; 2 pages.
Response to Office Action for European Application No. 06844068. 4, mail date Apr. 12, 2011, 8 pages.
European Patent Office, Communication Pursuant to Article 94(3) EPC in EP Application No. 06844068.4-2119, dated Jul. 1, 2009 (2 pages).
Office Action of Chinese Patent Application No. 200680027082.2 with English translation, dated Jun. 29, 2010, 7 pages.
Office Action for Chinese Application No. CN 2006-800270822, dated Aug. 5, 2009, 9 pages including English translation.
Response to Office Action for European Application No. 06844068. 4, dated Nov. 10, 2009, 12 pages.

* cited by examiner

*Primary Examiner* — Stephen J. Kalafut
(74) *Attorney, Agent, or Firm* — Foley & Lardner LLP

(57) ABSTRACT

Provided is a system for managing a lithium battery system having a plurality of cells. The battery system comprises a variable-resistance element electrically connected to a cell and located proximate a portion of the cell; and a device for determining, utilizing the variable-resistance element, whether the temperature of the cell has exceeded a predetermined threshold. A method of managing the temperature of a lithium battery system is also included.

13 Claims, 3 Drawing Sheets

LITHIUM BATTERY MANAGEMENT SYSTEM

CROSS-REFERENCE TO RELATED APPLICATIONS

This application claims the benefit of U.S. Provisional Patent Application No. 60/686,573 filed on Jun. 2, 2005, the entire disclosure of which is incorporated by reference herein.

STATEMENT REGARDING FEDERALLY SPONSORED RESEARCH OR DEVELOPMENT

The Government of the United States has rights in this invention pursuant to Contract No. DE-FC26-95EE50425, awarded by the U.S. Department of Energy.

BACKGROUND

The present inventions relate to batteries and battery systems. More specifically, the present inventions relate to lithium batteries (e.g., lithium-ion batteries, lithium-polymer batteries, etc.) and systems using such batteries that include systems for managing one or more batteries, battery modules, or battery cells when predetermined conditions have been met.

It is known to provide batteries for use in vehicles such as automobiles. For example, lead-acid batteries have been used in starting, lighting, and ignition applications. More recently, hybrid vehicles have been produced which utilize a battery (e.g., a nickel-metal-hydride battery) in combination with other systems (e.g., an internal combustion engine) to provide power for the vehicle.

It is generally known that lithium batteries perform differently than nickel-metal-hydride batteries. In some applications, it may be desirable to obtain the enhanced power/performance of a lithium battery. However, the application of lithium battery technology may present design and engineering challenges beyond those typically presented in the application of conventional nickel-metal-hydride battery technology.

The design and management of a lithium battery system that can be advantageously utilized in a hybrid vehicle may involve considerations such as electrical performance monitoring, thermal management, and containment of effluent (e.g., gases that may be vented from a battery cell). For example, it may be desirable to monitor the temperature of individual battery cells within a lithium battery system to ensure that thermal runaway conditions are not met. When predetermined conditions are met, it may be desirable to provide a system for managing one or more batteries, battery modules, or battery cells. It may be further desirable for this battery management system to balance the cells or modules until conditions change. It may also be desirable to provide a system for disconnecting a battery, battery module, or cell from the system when a battery cell approaches a predetermined temperature threshold.

SUMMARY

It would be desirable to provide a battery system of a type disclosed in the present application that includes any one or more of these or other advantageous features:

A battery system that utilizes lithium batteries or cells (e.g., lithium-ion batteries, lithium-polymer batteries, etc.) to provide power for a vehicle.

A lithium battery system for use in vehicles that includes a device or mechanism for monitoring the temperature of one or more batteries in the battery system.

A lithium battery system for use in vehicles that includes a device or mechanism for balancing one or more battery cells of a circuit in the event that a predetermined condition has been met.

A lithium battery system for use in vehicles that includes a device or mechanism for removing one or more battery cells from a circuit in the event that a predetermined condition has been met.

A lithium battery system for use in vehicles that includes a device or mechanism for balancing one or more batteries, battery modules, or cells of a circuit in the event that the temperature of such batteries exceeds a predetermined threshold value.

A lithium battery system for use in vehicles that includes a device or mechanism for disconnecting one or more batteries, battery modules, or cells from a circuit in the event that the temperature of such batteries exceeds a predetermined threshold value.

A lithium battery system that includes a relatively simple and accurate system for determining the temperature of batteries in the system and reducing the occurrence of thermal runaway for such batteries.

An exemplary embodiment relates to a system for managing a lithium battery system having a plurality of cells. The battery system comprises a variable-resistance element electrically connected to a cell and located proximate a portion of the cell; and a device for determining, utilizing the variable-resistance element, whether the temperature of the cell has exceeded a predetermined threshold.

Another exemplary embodiment relates to a method of managing the temperature of a lithium battery system which comprises: determining the voltage of a variable-resistance element which is electrically connected to the battery system and positioned proximate to any one of the cells in the system; determining, utilizing the voltage of the variable-resistance element, the temperature of the cell; determining whether the temperature of the cell has exceeded a predetermined threshold; and balancing the system in the event the temperature of the cell has reached the predetermined threshold temperature.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

According to an exemplary embodiment, a lithium battery system is provided that includes a system or mechanism for managing (e.g., balancing or disconnecting) one or more lithium batteries, battery modules, or cells (e.g., lithium-ion cells, lithium-polymer cells, etc. of any presently known configuration or other configuration that may be developed in the future) in the event that a predetermined condition occurs. Such a lithium battery system may be applied to individual lithium batteries or to one or more lithium batteries that are included in a module that includes a plurality of lithium batteries or cells. Further, according to an exemplary embodiment in which a module including a plurality of lithium batteries is provided, the module may be included in a system that includes a plurality of lithium battery modules of any presently known configuration or any other configuration that may be developed in the future.

Figure 1:
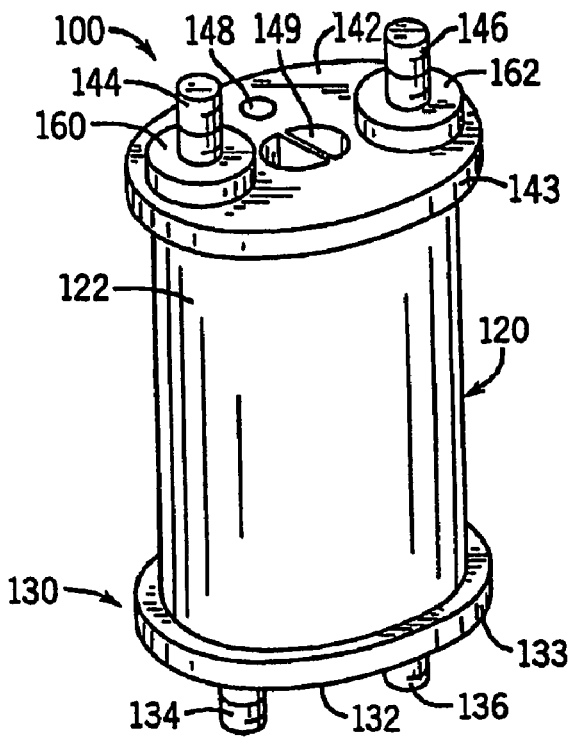
FIG. 1 is a perspective view of a lithium battery or cell according to an exemplary embodiment.
Figure 2:
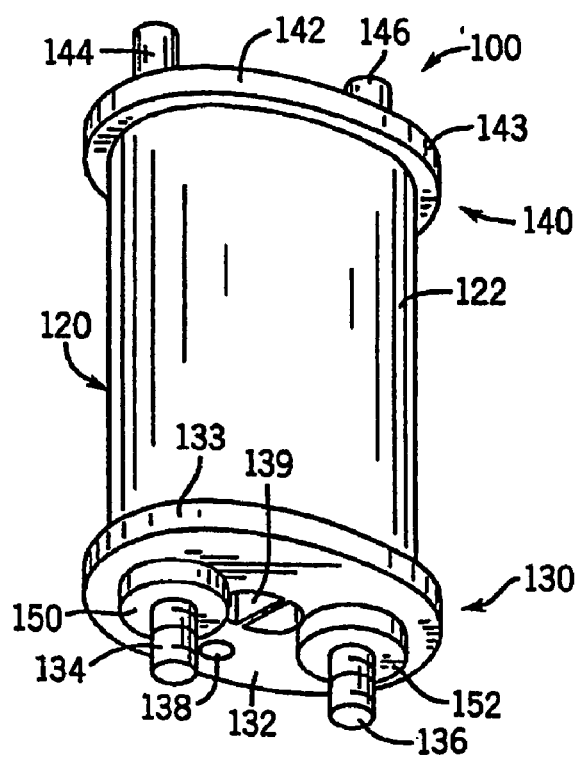
FIG. 2 is another perspective view of the battery shown in FIG. 1.

FIGS. 1-2 show a cell 100 according to an exemplary embodiment. According to an exemplary embodiment, cell 100 includes a container 120 (e.g., as may be provided in the form of a canister, housing, casing, holder, etc.), a first cover 132 (which may be referred to and/or be provided in the form of, for example, as an end cover, collar, cap, top portion, end portion, etc.) provided at a first end 130 of cell 100, and a second cover 142 (which may be referred to and/or be provided in the form of, for example, as an end cover, collar, cap, top portion, end portion, etc.) provided at a second end 140 of cell 100.

According to an exemplary embodiment, covers 132 and 142 will set or provide spacing between adjacent cells when the cells are positioned within a module. For example, covers 132 and 142 are shown in FIG. 1 as extending laterally to a greater extent than that of container 120; in the event that cell 100 is placed adjacent a similar cell, covers 132 and 142 would come into contact with similar covers on an adjacent cell to prevent contact between container 120 and the container of the adjacent cell (thus preventing direct electrical contact between the containers of adjacent cells).

According to an exemplary embodiment, covers 132 and 142 are intended to provide enhanced structural rigidity for cell 100. For example, cover 132 and cover 142 may be coupled or attached to container 120 (e.g., using an adhesive, by welding such as laser welding, etc.) in a manner which provides enhanced stiffness or strength for the container and cover assembly. Cover 132 and cover 142 may also be configured to hold the terminals (e.g., terminals 134, 136, 144, 146) in place and to allow cell 100 to engage the module structure (e.g., as opposed to utilizing the terminals to engage the module structure). Covers 132 and 142 may also be configured to allow the use of electronics for measuring temperature and/or voltage of the cells.

According to various exemplary embodiments, the covers may be made from any suitable material (e.g., metals, plastics, composites, etc.). According to a particular exemplary embodiment, cover 132 and cover 142 could be made from a suitable plastic or a polymeric material such as polypropylene or Noryl™ commercially available from GE Plastics of Pittsfield, Mass.

According to an exemplary embodiment, the covers do not seal the cells; a separate cover (e.g., a metal cover) may be positioned under the covers to seal the cell. According to another exemplary embodiment, covers coupled to the container may act as seals for the cell, thus eliminating the need to provide a separate cover (e.g., a metal cover) for sealing the cell.

According to an exemplary embodiment shown in FIGS. 1-2, cell 100 includes one or more vent ports (shown, e.g., as vent ports 138 and 148) configured for allowing effluent (e.g., gas, liquid, and/or other materials) to escape (e.g., to be exhausted or expressed from) the interior of cell 100. Vent ports 138 and 148 are shown as being provided in covers 132 and 142 near outer edges 133 and 143 of covers 132 and 142, respectively. By providing vent ports 138 and 148 near outer edges 133 and 143 of covers 132 and 142, cell 100 may be configured to allow venting on a side of a module in which it is installed. According to other exemplary embodiments, the vent ports may be located at any other suitable location on the covers (e.g., near the center of a cover).

While vent ports 138 and 148 are shown in FIGS. 1-2 as apertures provided in covers 132 and 142, venting may be accomplished using tubes or other systems which allow the venting or exhaust of effluent from within the cell. Vent ports 138 and 148 (or other structures utilized to perform a similar function) may be configured to allow venting of effluent from within cell 100 to a path or passage such as a channel or other structure provided within a battery module to allow removal of effluent other materials to a location away from the cells and/or the module in which such cells are provided. According to other exemplary embodiments, vent ports 138 and 148 may be coupled to tubes, hoses, or other structures configured to allow the removal of effluent to a location away from the cells and/or a module in which such cells are provided.

According to another exemplary embodiment, the vent ports may include a valve such as relief or burst valve to permit effluent to escape the cells. Such valves may be configured to allow gas and/or other materials to escape from the cell when the pressure within the cell reaches a particular threshold (e.g., a high pressure threshold of between approximately 3 psi and 30 psi). According to various other exemplary embodiments, the vent ports and valves may be separate components that may be coupled together and are configured to provide venting with a battery module.

According to an exemplary embodiment, vent ports 138 and 148 extend from the interior of cell 100 to the exterior of cell 100 and may provide a path for flow of effluent outward (e.g., away from the interior structure of the cell including a winding mandrel utilized to provide a structure about which electrodes and separators included within the cell may be wound or wrapped).

Two terminals or posts 134 and 136 extend from first end 130 of cell 100, and two terminals or posts 144 and 146 extend from second end 140 of cell 100. According to an exemplary embodiment, terminals 134 and 136 are positive terminals and terminals 144 and 146 are negative terminals for cell 100. It is intended that by having a plurality (e.g., two or more) of terminals in a terminal set for a cell, the cell would be provided with enhanced symmetric thermal conductivity (e.g., and possibly enhanced current distribution within the cell) in comparison with a cell having only a single positive terminal and a single negative terminal.

According to an exemplary embodiment shown in FIGS. 1-2, cell 100 may include members or elements 150, 152, 160, and 162 in the form of bushings provided in contact with terminals 134, 136, 144, and 146. Such bushings may be configured for transferring heat from the terminals (and hence, from within cell 100). For example, bushings 150, 152, 160, and 162 may be made from metal or another conductive material. According to other exemplary embodiments, the bushings may be made from a variety of other materials such as polymeric materials, ceramic materials, composites, etc. According to various other exemplary embodiments, no bushings are provided adjacent the terminals.

According to an exemplary embodiment, cell 100 includes an aperture or hole 139 provided in cover 132 and an aperture or hole 149 provided in cover 142. Apertures 139 and 149 may be configured to allow heat to be removed from the interior of cell 100 (e.g., the apertures may be configured to act as vents for dissipating heat) according to an exemplary embodiment in which the center of the cell is hollow.

As shown in FIGS. 1-2, container 120 has a generally oval shape or profile according to an exemplary embodiment. One advantageous feature of providing container 120 with a generally oval shape is that the surface area of outer surface 122 of container 120 is greater than that of a comparable cylindrical-shaped container, which may allow for increased heat transfer from the cell through container 120. Another advantageous feature of providing a container having a generally oval shape is that the thickness or width of the container is smaller than a cylindrical cell (i.e., with the thickness or width corresponding to the smallest axis of the container).

Figure 3:
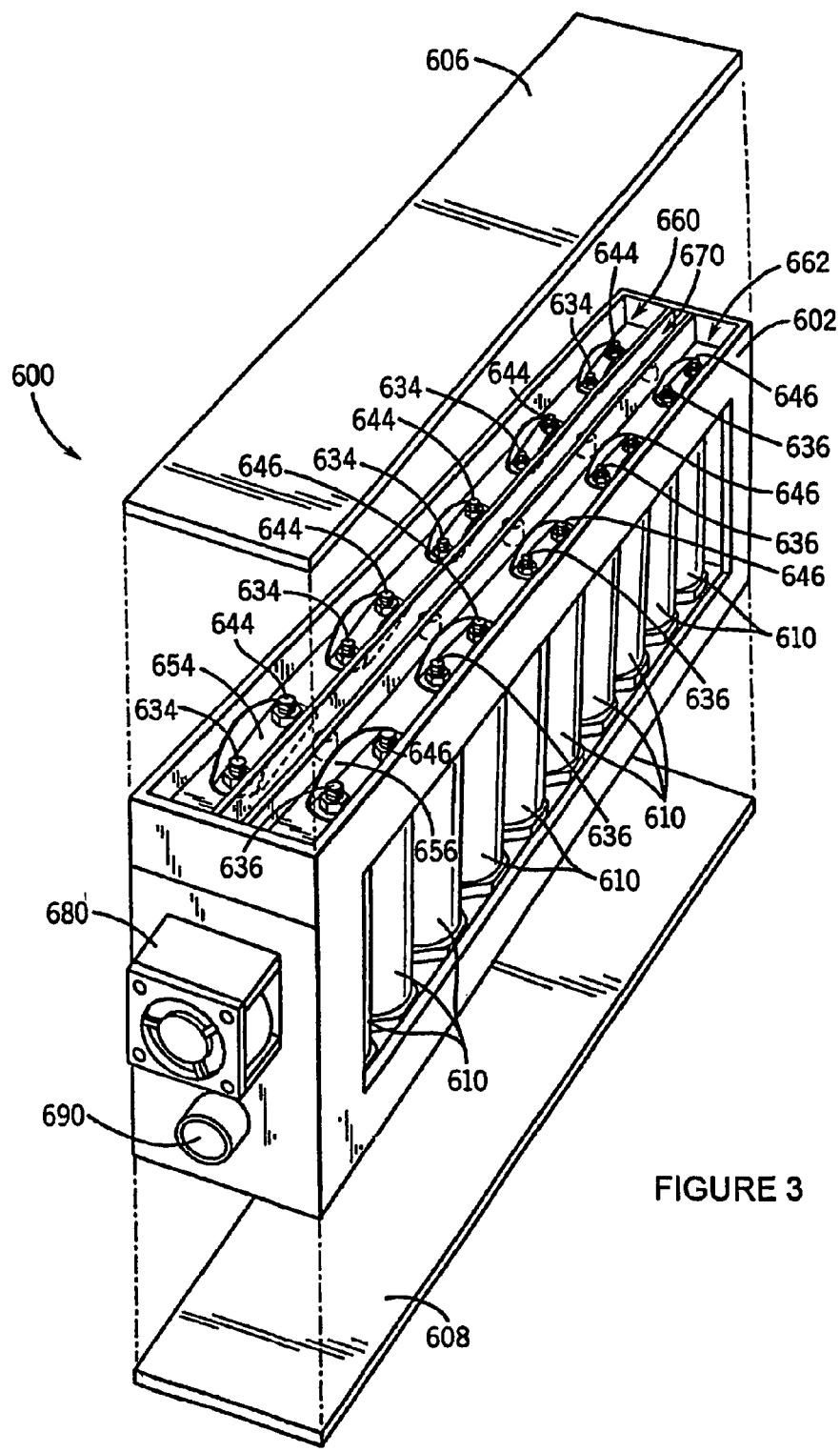
FIG. 3 is an exploded perspective view of a battery system in the form of a module that includes a plurality of lithium batteries or cells according to an exemplary embodiment.

FIG. 3 illustrates a battery system 600 that includes a module or assembly 602 which includes a plurality of batteries or cells 610 electrically coupled together. Module 602 includes a connector 690 having a center portion 692 and a connector 691 similar to connector 690 for electrically connecting the module to other modules and/or to a vehicle electrical system. While the embodiment illustrated in FIG. 3 depicts a module 602 that includes 10 cells 610, the number of cells provided within a particular module may vary according to various exemplary embodiments (e.g., modules may include greater or less than 10 cells). Further, while system 600 is depicted as including a single module 602, it should be noted that battery systems may include any number of modules which include any number of batteries (e.g., three modules may be provided within a battery system, each of which may include any suitable number of cells). The particular configuration utilized for a battery system and/or module may be optimized to provide power for a particular application according to various exemplary embodiments.

As shown in FIG. 3, adjacent cells 610 are arranged in a manner such that they are inverted relative to each other. That is, negative terminals 634 and 636 of a first battery are provided adjacent positive terminals 644 and 646 of an immediately adjacent battery. In this manner, a positive terminal (e.g., a terminal 644) may be electrically connected or coupled to an adjacent negative terminal (e.g., terminal 634) by a connector 654 (shown in the form of a buss bar).

As shown in FIG. 3, connectors 654 include one or more members or elements 656 (shown in the form of fins or extensions) which extend therefrom. Fins 656 may be configured to assist in the conduction of electricity between adjacent cells and/or to help dissipate heat from cells 610 and module 602. Fins 656 may be soldered, welded, or otherwise coupled to connectors 654 and/or to the terminals of the cells. The fins may be configured to have a relatively large surface area which enables greater dissipation of heat from the cells through their terminals.

According to an exemplary embodiment shown in FIG. 3, module 602 includes a plurality of channels along a top and bottom portion thereof. For example, a top portion of module 602 includes three channels 660, 662, and 670.

As shown in FIG. 3, module 602 is configured such that terminals (e.g., terminals 634, 636, 644, and 646) are provided within outer channels 660 and 662. Connectors 654 which couple terminals from adjacent cells together are also provided within outer channels 660 and 662. Channels 660 and 662 may be configured to provide a path for fluid to flow across the terminals and connectors included within the channels (e.g., fluid intended for warming of the terminals or cooling of the terminals). For example, a top cover 606 may be coupled to a top surface of module 602 to provide a cover for the various channels, while a bottom cover 608 may be provided on a bottom portion of module 602 to provide a cover for the channels included on the bottom portion of module 602. A gas such as air or another fluid may be passed through channels 660 and 662 to carry heat away from the terminals and connectors included within such channels. A fan 680 or other mechanism may be utilized to force a fluid such as air into the channels or to draw a fluid such as air from the channels to provide a means to move the fluid over or across the terminals and connectors.

While FIGS. 1-3 illustrate particular exemplary embodiments of lithium batteries and battery systems, any of a variety of lithium batteries or battery systems may be used according to various other exemplary embodiments. For example, according to various exemplary embodiments, the physical configuration of the individual cells and/or the modules may be varied according to design objectives and considerations. According to one exemplary embodiment, a system may include a module having ten cells. According to other exemplary embodiments, a different number of cells may be included in a module.

Figure 4:
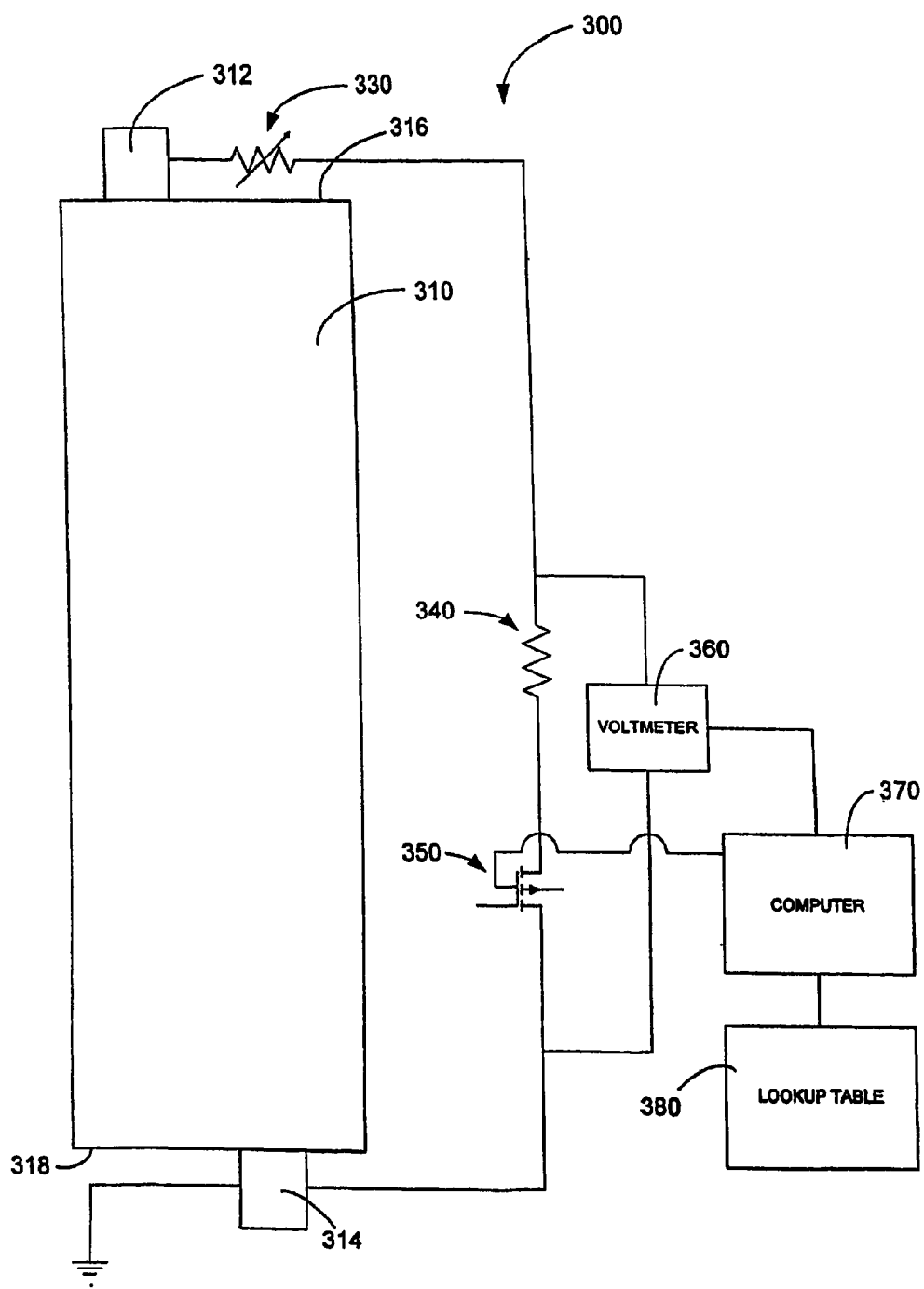
FIG. 4 is a schematic view of a lithium battery or cell and a system for balancing, disconnecting, or otherwise managing the battery in the event that a predetermined condition is satisfied.

As shown in FIG. 4, according to an exemplary embodiment, a system 300 is provided for balancing, disconnecting or removing one or more batteries or cells 310 from a circuit when a predetermined condition has been met. According to an exemplary embodiment, system 300 is configured to disconnect one or more modules (each module including a plurality of cells) from a load (e.g., a vehicle load) when a predetermined temperature threshold has been met. In this manner, electric power provided by the cells to the vehicle is terminated to avoid continued elevated thermal conditions in any of the cells.

According to an exemplary embodiment, cell 310 is a lithium-ion cell having a fully-charged voltage of between approximately 0 and 5 volts. According to a particular exemplary embodiment, cell 310 has a fully charged voltage of between approximately 3.0 and 4.2 volts.

System 300 includes an element provided in proximity with cell 310 that is configured for sensing temperature and/or that is configured such that it exhibits characteristics that vary with temperature. According to an exemplary embodiment as shown in FIG. 4, an element 330 in the form of a variable resistor (e.g., a thermistor such as a positive or negative temperature coefficient resistor) is electrically coupled to at least one terminal (e.g., positive terminal 312) of cell 310. For convenience, element 330 is referred to below as "variable resistor 330," although it should be understood that such an element may comprise other types of devices according to various other exemplary embodiments.

Variable resistor 330 is provided in relatively close proximity to a top surface 316 of cell 310 (e.g., near positive terminal 312). Such a variable resistor may be provided in contact with a portion of cell 310 according to an exemplary embodiment. According to a particular exemplary embodiment, an element such as a variable resistor may be included (e.g., integrated) in a cover of cell 310 (e.g., a cover such as that shown as cover 142 in FIG. 1). According to another particular exemplary embodiment, a variable resistor may be included as part of a battery terminal or battery terminal assembly for cell 310.

While variable resistor 330 is shown in FIG. 4 as being provided in relatively close proximity to top surface 316 of cell 310, it should be noted that according to other exemplary embodiments, the variable resistor may be provided in relatively close proximity to a bottom surface 318 of cell 310, for example, near negative terminal 314 (e.g., it may be included in a cover of the cell, etc.).

According to a particular exemplary embodiment, variable resistor 330 is a positive temperature coefficient (PTC) resistor having a resistance that varies linearly with temperature and which has a resistance of approximately 300 ohms at a temperature of approximately 80° C. According to other exemplary embodiments, one or more variable resistors may be provided in place of, or in addition to, variable resistor 330 that have different resistances (e.g., the resistance may vary non-linearly with temperature, the resistance may have a different resistance at a temperature of approximately 80° C., etc.). In other exemplary embodiments, variable resistor 330 may have a resistance that varies either linearly or logarithmically with temperature. Companies that have supplied or supply a variety of variable resistors such as variable resistor 330 are Raychem, Littelfuse, and Burroughs Corp.

Variable resistor 330 is configured such that its resistance changes (e.g., increases) with increasing temperature according to an exemplary embodiment in which the variable resistor is a positive temperature coefficient (PTC) resistor. According to an exemplary embodiment in which a negative temperature coefficient resistor is utilized, the resistance will decrease with increasing temperature.

Because of its location, variable resistor 330 may have a temperature that is similar to the temperature of cell 310 at a location adjacent the variable resistor 330. Knowing the characteristics of variable resistor 330 (e.g., how its resistance varies with temperature, etc.), the temperature of cell 310 adjacent variable resistor 330 may be approximated or determined. According to an exemplary embodiment, a system may be provided which includes a number of elements that are configured to balance or disconnect cell 310, or the battery module in which cell 310 is provided, when the resistance of variable resistor 330 increases to a predetermined threshold value. One exemplary embodiment of such a system is shown as system 300 in FIG. 4, although it should be noted that various other systems may also be utilized according to other exemplary embodiments.

According to an exemplary embodiment, variable resistor 330 has a resistance of approximately 1.0 ohm when cell 310 is operating at a normal temperature, and a resistance of approximately 300 ohms or greater when the temperature of cell 310 exceeds approximately 80° C. According to other exemplary embodiments, other variable resistors may be utilized which have different resistance values and/or functions (e.g., a resistance between approximately 0.1 and 10 ohms).

As shown in FIG. 4, a resistor 340 (e.g., a fixed resistor having constant resistance) and a switch 350, such as a MOSFET, are provided in series with variable resistor 330. According to an exemplary embodiment, switch 350 is configured to drain voltage from cell 310 across resistor 340 when the voltage of cell 310 exceeds a predetermined value (e.g., to balance the cell voltage with other cells in a module).

In normal operating conditions in which the temperature of cell 310 is below a predetermined threshold (e.g., 80° C.), the voltage across variable resistor 330 may be relatively small as compared to the voltage across resistor 340. According to an exemplary embodiment, the resistance of resistor 340 is at least 10 to 100 times the resistance of variable resistor 330 under normal operating conditions. When the temperature of cell 310 increases above the predetermined threshold, the resistance in variable resistor 330 also increases, which results in a corresponding increase in voltage across variable resistor 330. In such a situation, the voltage across resistor 340 and switch 350 will decrease. In the event that the voltage across resistor 340 and switch 350 falls below a predetermined threshold (e.g., 2.8 volts), cell 310 will be determined to be bad.

One embodiment of system 300 operates during normal operating conditions (e.g., with cell 310 within an acceptable range of operating temperatures) such that switch 350 allows current to travel through the circuit. The circuit acts as a voltage divider in which a relatively small proportion of the voltage is across variable resistor 330 (i.e., variable resistor 330 has a relatively low resistance at normal operating temperatures), and the majority of voltage in the circuit is across resistor 340. The amount of voltage across each of the elements, of course, will depend upon the properties of the components utilized according to other exemplary embodiments (e.g., the voltages across resistors 330 and 340 may be approximately equal during normal operating conditions or may be otherwise selected in accordance with design considerations). When the temperature of variable resistor 330 increases above a predetermined threshold temperature, the resistance of variable resistor 330 changes, causing a corresponding change in voltage across both variable resistor 330 and resistor 340 (and, accordingly, across switch 350).

As shown in FIG. 4, a device 360 may be provided for measuring the voltage across resistor 340 and switch 350 according to an exemplary embodiment. The measured voltage may be correlated to the temperature near terminal 312 of cell 310 to provide an approximate value of the temperature of cell 310 (i.e., knowing the voltage across and the resistance of the fixed resistor 340 allows one to determine the voltage and resistance of the variable resistor 330, which can be used to determine the temperature of the variable resistor 330 if the relationship between temperature and resistance is known). According to another exemplary embodiment, a device similar to device 360 may be provided such that it measures the voltage across variable resistor 330.

As further displayed in FIG. 4, a device 370, in the form of a computing device or the like, may be provided to manage a battery system, module, or cell. According to an exemplary embodiment, device 370 is a computer (e.g., containing or coupled to a CANbus processor). Device 370 may monitor the temperature of one or more cells. Device 370 may monitor the cell(s) by inferring the temperature of the cell(s). The temperature of the cell(s) may be inferred by device 370 via the examination of the voltage across resistor 340 and switch 350. In one embodiment, device 370 receives the voltage information from device 360.

Device 370 may perform a variety of actions based on the temperature and other factors (e.g., balancing a cell or removing a module). The initiation of a particular action may depend on which circumstance or circumstances are detected. For example, in one embodiment, device 370 may take an action when one or more voltage conditions exist. In one exemplary embodiment, device 370 disconnects an entire module or group of modules when it determines that any one or more of three conditions have been satisfied. These three conditions may include: (a) the temperature has reached some predetermined threshold (e.g., the temperature has reached or exceeded 80° C.); (b) the temperature has increased some predetermined temperature amount during a period of time less than some predetermined time period (e.g., the temperature has increased by 10° C. in less than one minute); and (c) a cell or group of cells has remained some predetermined temperature higher than other cells over a time period (e.g., a cell has remained at a temperature 20° C. higher than other cells in a module for a time period longer than one minute).

In one particular embodiment, device 370 uses one or more lookup tables or truth tables 380 to determine whether predetermined conditions exist in which the device should take a action. Lookup table 380 may include a column of possible voltage conditions of resistor 340 and switch 350, matched to a column of corresponding inferred temperatures of cell 310. One possible example of lookup table 380 is displayed below as Table I. In the exemplary embodiment in which Table I might be used, cell 310 has a 4.0 volt center tap voltage (e.g., as shown in the "Circuit Off" column in Table I, which corresponds to a situation in which switch 350 is open), resistor 330 has a normal resistance of 0.2 milliohms, and resistor 340 is a 4 ohm resistor. When the temperature of cell 310 and resistor 330 increases, the corresponding voltage read by device 360 and device 370 across resistor 340 decreases. Device 370 may use a lookup table 380 such as that displayed in Table I to relate a read voltage to a temperature condition of cell 310. For example, when device 360 and 370 read a voltage of 0.1 volts with the circuit on, device 370 may infer a cell 310 temperature of 80° C. by matching the voltage in the "Circuit On" column of Table I to the "Temperature in Degrees Celsius" column of Table I (the "Circuit On" column corresponds to a situation in which the switch 350 is closed). According to one embodiment, when this temperature condition is reached or exceeded, device 370 may take the action of disconnecting the battery module. In other embodiments, device 370 may disconnect the entire battery or turn the vehicle off.

TABLE I

| Temperature in Degrees Celsius | Circuit Off | Circuit On |
|---|---|---|
| 80 | 4 | 0.1 |
| 70 | 4 | 0.4 |
| 60 | 4 | 2.6 |
| 50 | 4 | 3.7 |
| 40 | 4 | 3.82 |
| 30 | 4 | 3.9 |
| 20 | 4 | 3.95 |
| 10 | 4 | 3.98 |
| 0 | 4 | 4 |
| −10 | 4 | 4 |
| −20 | 4 | 4 |
| −30 | 4 | 4 |

According to another exemplary embodiment, device 370 may balance a cell relative to other cells when the voltage of the cell falls below or climbs above certain predetermined thresholds. In one embodiment, device 370 will drain voltage from the cell by using resistor 340 as a discharging resistor (e.g., during a time when the vehicle is not operating, such as during the night). To begin the process of balancing the cell, device 370 will close switch 350. Upon closing switch 350, the resulting circuit, including discharging resistor 340, will cause the voltage in cell 310 to drop. The switch 350 may be opened when the cell 310 reaches the desired voltage level.

In this embodiment, circuit 300 may be configured to balance cell 310. In a normal state, switch 350 may be open and devices 360 and 370 may read a normal cell voltage. In this exemplary embodiment, low or no current may flow through device 360 and device 370 (device 360 having a resistance of 1-10 mega ohms). If the voltage of cell 310 increases, the voltage read by devices 360 and 370 will also increase. If the voltage read by devices 360 and 370 increases beyond a certain predetermined threshold, device 370 may close switch 350. When switch 350 closes, the current through discharging resistor 340 will cause the voltage of cell 310 to begin decreasing. Discharging cell 310 through resistor 340 may balance cell 310 with the rest of the cells in the battery module.

In an exemplary embodiment, device 370 may also include a process in which the computer will track how often it balances particular cells or modules. In the event that device 370 detects or recognizes a relatively frequent balancing of one or more cells or modules, device 370 can disconnect the bad cell or the entire module from the power delivery system of the vehicle.

It should be understood by those of ordinary skill in the art reviewing this disclosure that any of a variety of variable resistors, resistor(s) (e.g., resistor 340, which may comprise one or more resistors), and switches may be utilized according to various exemplary embodiments. For example, the resistances of the variable resistor and the fixed resistor may differ according to other exemplary embodiments. The various components of system 300 may be selected based on a variety of factors, including availability, cost, and other design considerations. Any suitable combination of components as described above may be utilized to provide a system that balances, disconnects, or otherwise manages a cell or battery module such as that described above when a predetermined condition (e.g., a temperature) is reached. The various components may be selected to balance, remove, or otherwise manage the cells, battery modules, or batteries in a circuit when temperatures above 80° C. or any other predetermined threshold temperature or other temperature events or conditions occur.

It should also be noted that a system such as system 300 described above may be utilized to balance, disconnect, or otherwise manage an entire module from a vehicle electrical system in the event that one or more of the batteries included in the module have a temperature that exceeds a predetermined threshold. A variable resistor or similar element may be provided adjacent each cell included in the module or at one or more locations within the module (e.g., to sense the "composite" temperature of the entire module). In the event that the temperature of one or more of the batteries (or the composite temperature of the entire module) exceeds a predetermined threshold temperature, the module may be disconnected (e.g., using a switch such as a MOSFET) from a circuit (e.g., thus disconnecting the module from a vehicle electrical system).

It is important to note that the construction and arrangement of the system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied (e.g., the variable temperature resistor may be provided adjacent a negative terminal of a battery), and the nature or number of discrete elements or positions may be altered or varied (e.g., a plurality of resistors may be provided in place of a single resistor). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

While the exemplary embodiments illustrated in the FIGs and described above are presently preferred, it should be understood that these embodiments are offered by way of example only. For example, the teachings herein can be applied to any battery system and are not limited to lithium battery systems in vehicles. Accordingly, the battery system is not limited to a particular embodiment, but extends to various modifications that nevertheless fall within the scope of the appended claims.

What is claimed is:

1. A system for managing a lithium battery system having a plurality of cells comprising:
   a variable-resistance element electrically connected to a cell and located proximate a portion of the cell;
   a device for determining, utilizing the variable-resistance element, whether the temperature of the cell has exceeded a predetermined threshold; and
   a discharge resistor selectively electrically connected to the cell and configured to drain voltage from the cell when connected thereto and effectively balance the cell voltage with other cells in the lithium battery system in the event that the device detects a cell temperature in excess of the predetermined threshold.

2. The system for managing a lithium battery system of claim 1 further comprising a voltmeter configured to measure the voltage across an element of the system for managing a lithium battery system.

3. The system for managing a lithium battery system of claim 2 wherein the device is a computer configured to reference a lookup table comprising measured voltages across the element with respect to measured temperatures, wherein the computer determines the temperature of the cell by referencing the lookup table.

4. The system for managing a lithium battery system of claim 1 wherein the device is configured to determine the frequency with which the cell has exceeded the predetermined threshold temperature and disconnect the cell from the lithium battery system in the event that the predetermined threshold temperature has been exceeded a predetermined number of times.

5. The system for managing a lithium battery system of claim 1 further comprising a switch configured to selectively electrically connect the discharge resistor to the cell and drain voltage from the cell across the discharge resistor.

6. The system for managing a lithium battery system of claim 1 wherein each of the plurality of cells has a variable resistance element coupled thereto and the device is configured to determine if any of the plurality of cells has a temperature that exceeds the predetermined threshold.

7. The system for managing a lithium battery system of claim 6 wherein the device is configured to disconnect any one of the plurality of cells from a vehicle electrical system when at least one of the plurality of cells exceeds the predetermined threshold temperature a predetermined number of times.

8. The system for managing a lithium battery system of claim 1 wherein the voltage of the variable-resistance element varies with temperature.

9. The system for managing a lithium battery system of claim 8 wherein the variable-resistance element is a thermistor.

10. The system for managing a lithium battery system of claim 1 wherein the device is configured to disconnect the lithium battery system from a vehicle electrical system when at least one of the plurality of cells exceeds the predetermined threshold.

11. A method of managing the temperature of a lithium battery system, comprising:
    determining the voltage of a variable-resistance element which is electrically connected to the battery system and positioned proximate to any one of the cells in the system;
    determining, utilizing the voltage of the variable-resistance element, the temperature of the cell;
    determining whether the temperature of the cell has exceeded a predetermined threshold; and
    balancing the cell voltage with other cells in the lithium battery system in the event the temperature of the cell has reached the predetermined threshold temperature.

12. The method of claim 11 further comprising:
    disconnecting the cell from the system in the event that the predetermined threshold temperature has been exceeded a predetermined number of times.

13. The method of claim 11 further comprising:
    draining voltage from any one of the cells via a discharge resistor selectively electrically connected to any one of the cells in the event that the predetermined threshold temperature has been exceeded.

* * * * *